United States Patent [19]

Shackelford et al.

[11] Patent Number: 5,511,196
[45] Date of Patent: Apr. 23, 1996

[54] METHOD AND SYSTEM IN A DATA PROCESSING SYSTEM FOR THE ENHANCEMENT OF RELATIONSHIPS BETWEEN REFERENCE OBJECTS IN AN OBJECT ORIENTED ENVIRONMENT AND A DATA OBJECT OUTSIDE AN OBJECT ORIENTED ENVIRONMENT

[75] Inventors: Floyd W. Shackelford, Buford; Judith A. Smith, Marietta; April D. E. Stiles, Atlanta; Kenneth D. Yates, Marietta, all of Ga.

[73] Assignee: International Business Machines Corporation, Armonk, N.Y.

[21] Appl. No.: 977,377

[22] Filed: Nov. 17, 1992

[51] Int. Cl.$^6$ .................................................. G06F 15/40
[52] U.S. Cl. ..................... 395/700; 395/600; 364/DIG. 1; 364/282.1; 364/282.4
[58] Field of Search ......................... 364/DIG. 2, DIG. 1; 395/600

[56] References Cited

U.S. PATENT DOCUMENTS

| | | | |
|---|---|---|---|
| 4,635,189 | 1/1987 | Kendall | 364/200 |
| 4,821,220 | 4/1989 | Duisberg . | |
| 4,939,689 | 7/1990 | Davis et al. | 364/900 |
| 5,001,628 | 3/1991 | Johnson et al. | 364/200 |
| 5,008,853 | 4/1991 | Bly et al. | 364/900 |
| 5,019,961 | 5/1991 | Addesso et al. . | |
| 5,093,914 | 3/1992 | Coplien et al. . | |
| 5,129,083 | 7/1992 | Cutler et al. | 395/600 |
| 5,136,707 | 8/1992 | Block et al. | 395/600 |
| 5,181,162 | 1/1993 | Smith et al. | 364/419 |
| 5,212,787 | 3/1993 | Baker et al. | 395/600 |
| 5,274,802 | 12/1993 | Atline | 395/600 |
| 5,319,777 | 6/1994 | Perez | 395/600 |
| 5,333,316 | 7/1994 | Champagne et al. | 395/600 |

OTHER PUBLICATIONS

Hardwick, M.; Samaras, G., Using a relational data-base as an index to a distributed object D-B in engineering design sys.

IEEE Comput. Soc. Press, Los Alamos, CA, ABS #C90047407 published date; 1989.

Neuhold, E. J.; Kent, W.; Ming-Chen Shan, object identification in interoperable database systems. IEEE, 1991, ABS #C9204-6160B-014.

Sundstrom, Gunilla A.; Bossert, Greg N.; Mertzig, Thomas F., Principal Design of an integrated graphical support system. IEEE, pub Date 1991, E. I. Monthly No. EIM9210-053137.

"Changing Configuration Files Under Program Control," IBM Technical Disclosure Bulletin, vol. 33, No. 6A Nov., 1990, p. 242.

"Heterogenous Object Model-View Relationships," IBM Technical Disclosure Bulletin, vol. 33, No. 6B, Nov., 1990, pp. 242, 243.

Primary Examiner—Kevin A. Kriess
Assistant Examiner—Majid Banankhah
Attorney, Agent, or Firm—Lisa L. B. Yociss; Andrew J. Dillon; John H. Timar

[57] ABSTRACT

A method and system in a data processing system for the establishment of relationships between reference objects in an object oriented environment and an associated data object residing outside an object oriented environment. A data object within an application outside an object oriented environment is identified. Multiple reference objects within an oriented environment are then established. Each reference object has a unique identifier and is associated with one of multiple users. Each reference object is associated with the identified data object so that multiple users may concurrently access the data object utilizing an associated reference object. The associated data object may then be modified in response to a modification of any reference object. Similarly, the reference objects may be modified in response to a modification of the associated data object.

9 Claims, 9 Drawing Sheets

METHOD AND SYSTEM IN A DATA PROCESSING SYSTEM FOR THE ENHANCEMENT OF RELATIONSHIPS BETWEEN REFERENCE OBJECTS IN AN OBJECT ORIENTED ENVIRONMENT AND A DATA OBJECT OUTSIDE AN OBJECT ORIENTED ENVIRONMENT

BACKGROUND OF THE INVENTION

1. Technical Field

The present invention relates in general to a method and system in a data processing system for the establishment of relationships between reference objects in an object oriented environment and a data object outside an object oriented environment and in particular to a method and system in a data processing system for the association of reference objects within an object oriented environment with a data object outside an object oriented environment. Still more particularly, the present invention relates to a method and system in a data processing system for the modification of an associated data object in response to a modification of any reference object, and a modification of all reference objects in response to a modification of an associated data object.

2. Description of the Related Art

Object oriented programming has experienced growing popularity with application developers primarily due to the ability of this type of programming to reuse code. The object oriented environment more closely models "real world" entities.

An object in an object oriented environment consists of related pieces of code and data. An object generally has a library of methods which are essentially unique to an object, giving an object its specific behaviors. The "class" of an object defines a grouping based on one or more properties, and an "instance" is a single item in a class. For example, a class of an object could be considered as analogous to professions, i.e. lawyers, doctors, engineers, and programmers, with an instance of an object being analogous to a particular individual in a class. Agents are objects within an object oriented computing environment that do work for a user.

A class defines methods for constructing new instances and also instance methods which define how an instance behaves and reacts to incoming messages. The instance variables define the particular features of an instance of an object such as an individual's salary. These instance variables may be defined or may be empty, awaiting definition. An instance's data structure is described by its collection of instance variables. Pointers are used to point to a structure in object form.

In some computer systems, objects within an object oriented environment may be linked to objects outside the object oriented environment so that communication between the two types of objects may occur. In these prior art systems, an object is created in the object oriented environment which includes information necessary to translate data from an object oriented format into a format suitable for the other environment. In this manner, objects within the object oriented environment may communicate with external objects.

It should therefore be apparent that a need exists for a method and system for establishing reference objects within an object oriented environment which are associated with a data object outside the object oriented environment, whereby modifications are made to an associated data object in response to modifications made to any reference object, and whereby modifications are made to all reference objects in response to modifications made to an associated data object.

SUMMARY OF THE INVENTION

It is therefore one object of the present invention to provide an improved method and system within a data processing system for the establishment of relationships between reference objects in an object oriented environment and a data object outside an object oriented environment.

It is another object of the present invention to provide an improved method and system in a data processing system for the association of reference objects within an object oriented environment with a data object outside an object oriented environment.

It is yet another object of the present invention to provide an improved method and system in a data processing system for the modification of an associated data object in response to a modification of any reference object, and a modification of all reference objects in response to a modification of an associated data object.

The foregoing objects are achieved as is now described. A method and system in a data processing system are provided for the establishment of relationships between reference objects in an object oriented environment and an associated data object residing outside an object oriented environment. A data object within an application outside an object oriented environment is identified. Multiple reference objects within an oriented environment are then established. Each reference object has a unique identifier and is associated with one of multiple users. Each reference object is associated with the identified data object so that multiple users may concurrently access the data object utilizing an associated reference object. The associated data object may then be modified in response to a modification of any reference object. Similarly, the reference objects may be modified in response to a modification of the associated data object.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
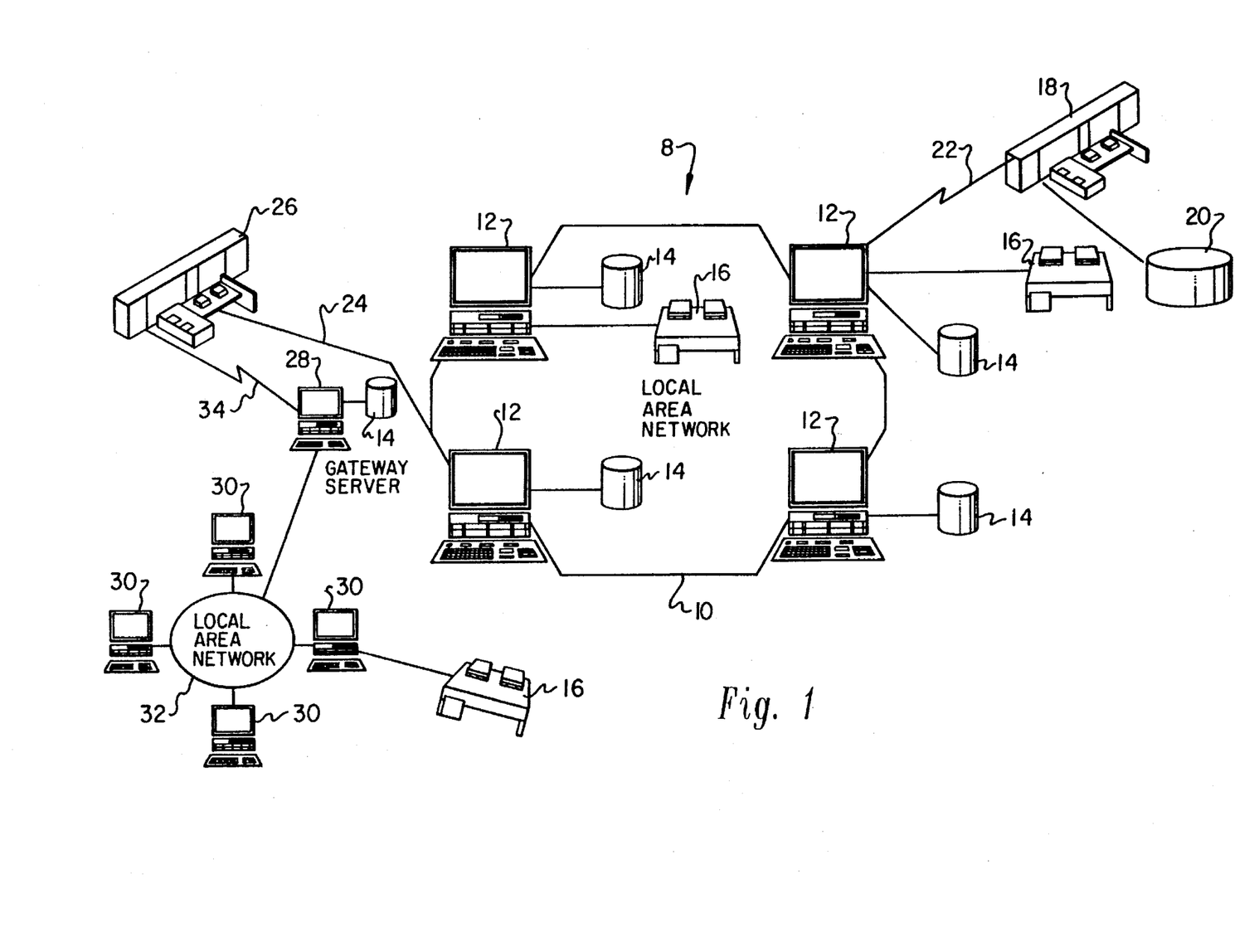
FIG. 1 depicts a pictorial representation of a data processing system which may be utilized to implement the method and system of the present invention.

With reference now to the figures and in particular with reference to FIG. 1, there is depicted a pictorial representation of a data processing system 8 which may be utilized in accordance with the method and system of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method and system of the present invention, to store the various data objects or documents which may be periodically accessed and processed by a user within data processing system 8. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. Mainframe computer 26 may be coupled via communications link 34 to gateway server 28. Gateway server 28 is preferably an individual computer or Intelligent Work Station (IWS) which serves to link Local Area Network (LAN) 32 to Local Area Network (LAN) 10.

Figure 2:
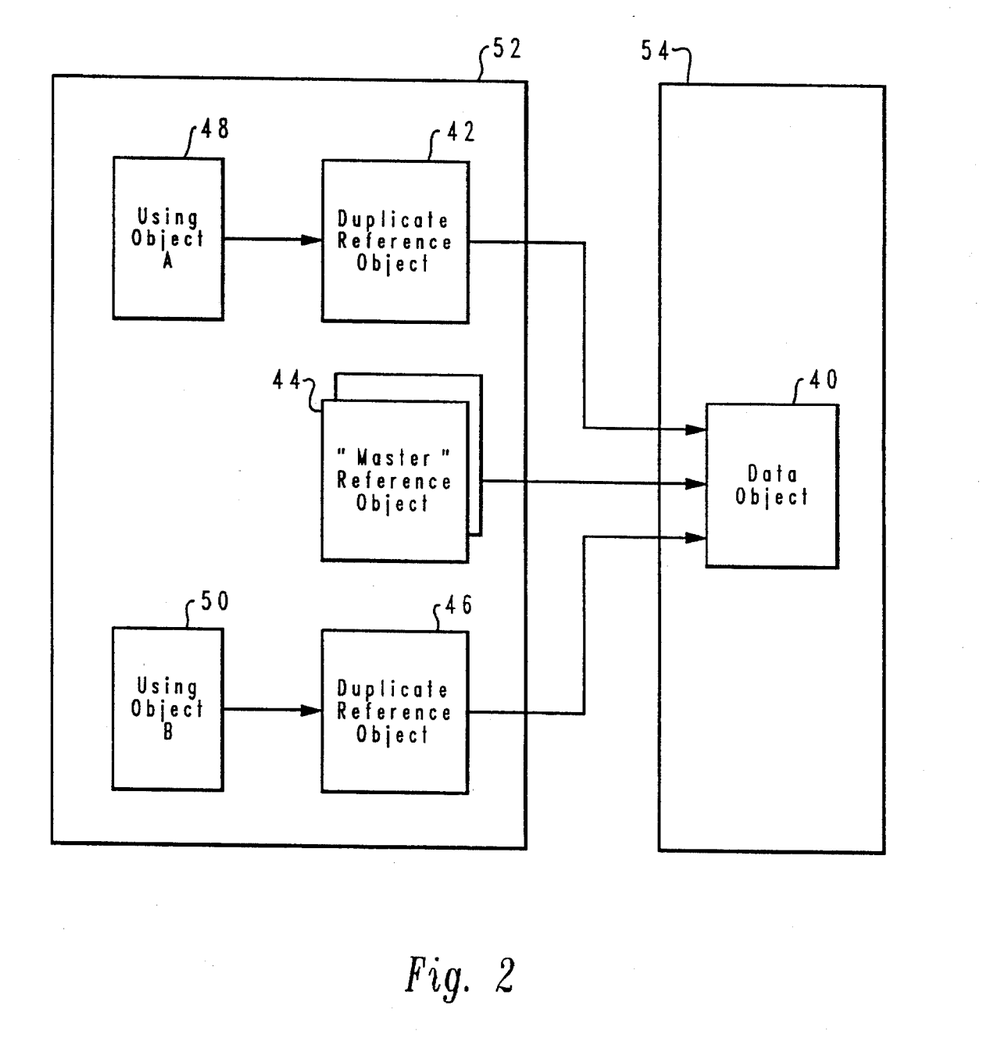
FIG. 2 illustrates a block diagram of a data object, reference objects, and using objects in accordance with the method and system of the present invention.

With reference now to FIG. 2, there is illustrated a block diagram of a data object 40, reference objects 44, and 46, and using objects 48 and 50 all within data processing system 8 in accordance with the method and system of the present invention. Reference objects 42, 44, and 46 and using objects 48 and 50 reside within an object oriented environment 52 while data object 40 resides within an application 54 outside of object oriented environment 52.

Multiple users, which may comprise actual users of other applications or systems, depicted by using object 48 and using object 50, within object oriented environment 52 may desire to access and modify data object 40, such as by deleting it or by sending it to another application. A master reference object 44 is established and associated with data object 40. Copies of the master reference object 44 are then established and associated with each user. For example, reference object 42 is created and associated with using object 48 while reference object 46 is created and associated with using object 50. Therefore, each user within an object oriented environment has an associated reference object within the object oriented environment which then is associated with a data object in an application outside the object oriented environment. It should also be apparent that a reference object may be automatically created in response to a creation of a data object.

A reference object within an object oriented environment created in this manner may be associated with a data object external to the object oriented environment. Thereafter, when a user modifies a data object, all associated reference objects are also modified to reflect the new state of the data object. Similarly, when a user modifies a reference object, the associated data object is also modified to reflect the new state of the reference object.

Multiple object oriented environments and multiple applications may all exist within one data processing system. One object oriented environment may be linked to one or more applications at one time, and one application may be linked to one or more object oriented environments at one time.

Figure 3:
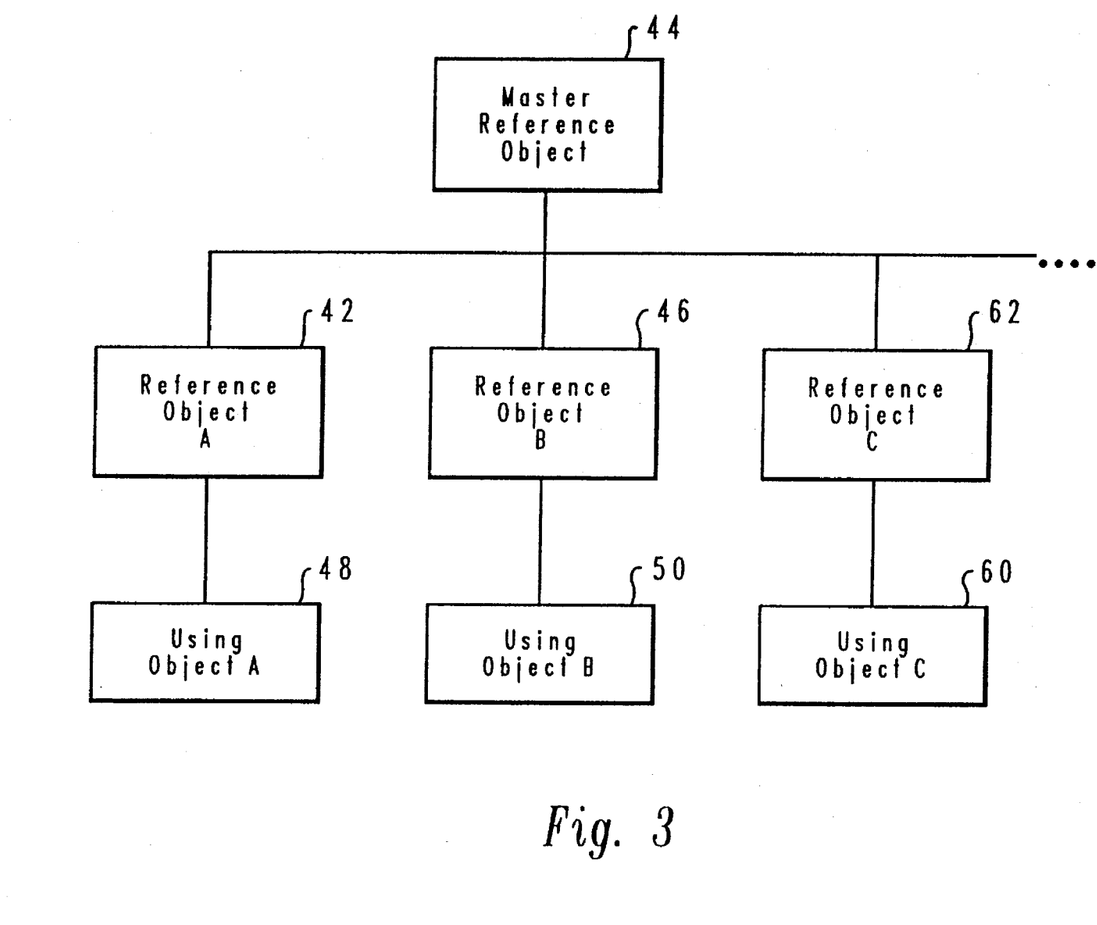
FIG. 3 depicts a block diagram of multiple users and the associated reference objects in accordance with the method and system of the present invention.

Referring to FIG. 3, there is depicted a block diagram of multiple users and associated reference objects established in accordance with the method and system of the present invention. As described above, a copy of master reference object 44 is created and associated with each user. In this manner, using object 48 is associated with reference object 42, using object 50 is associated with reference object 44, and using object 60 is associated with reference object 62. Although the content of reference objects 42, 44, and 46 is the same, each object has a unique identifying name. Therefore, there is a one-to-one relationship between reference objects and using objects, so that it is easy to maintain control of the reference objects. In this manner, it is clear which reference object is being utilized each time a using object creates, modifies, or deletes a reference object.

Figure 4:
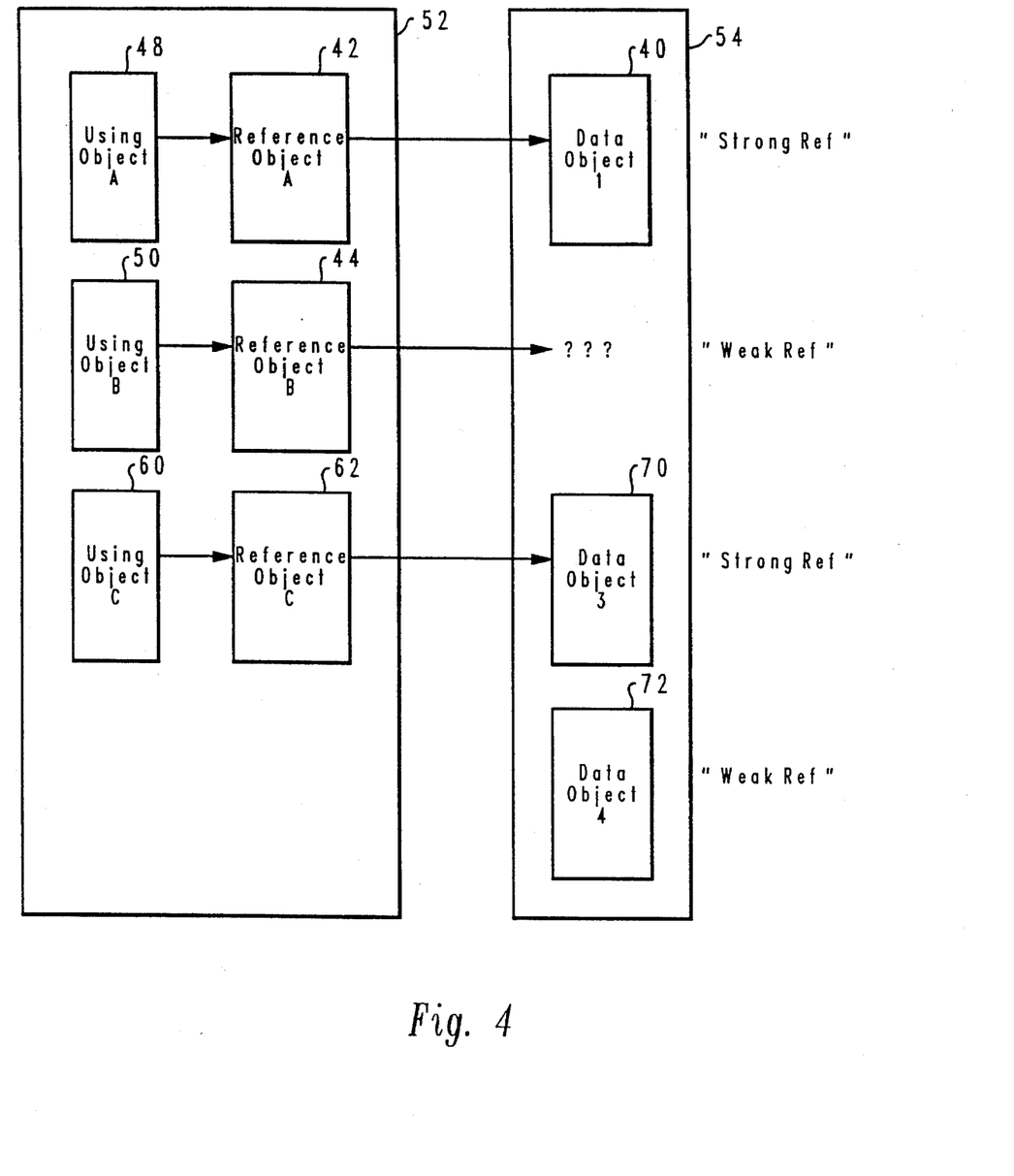
FIG. 4 illustrates a block diagram depicting strong and weak reference relationships created in accordance with the method and system of the present invention.

With reference to FIG. 4, there is illustrated a block diagram depicting strong and weak reference relationships created in accordance with the method and system of the present invention. As illustrated, a strong reference relationship exists between reference object 42 and data object 40. When a strong relationship exists, there will be a validation within object oriented environment 52 that a reference object has an existing data object, and that a data object has an associated reference object.

The relationship between reference object 42 and data object 40, and between reference object 62 and data object 70 are strong relationships. Reference objects 42 and 62 will be maintained along with data objects 40 and 70. There will also be a validation that data objects 40 and 70 exist.

A weak relationship exists in accordance with the method and system of the present invention when there is no validation that a data object exists for a reference object, as depicted by reference object 44. When a data object has no associated reference object a weak relationship also exists, as illustrated by data object 72.

Weak or strong reference relationships may be defined for each application and object oriented environment. Both types of relationships may coexist within a data processing system. Those skilled in the art will recognize that weak references increase the flexibility of the data processing system and reduces processing overhead. However, strong reference relationships permit better control between the object oriented environment and applications external to that environment.

Figure 5:
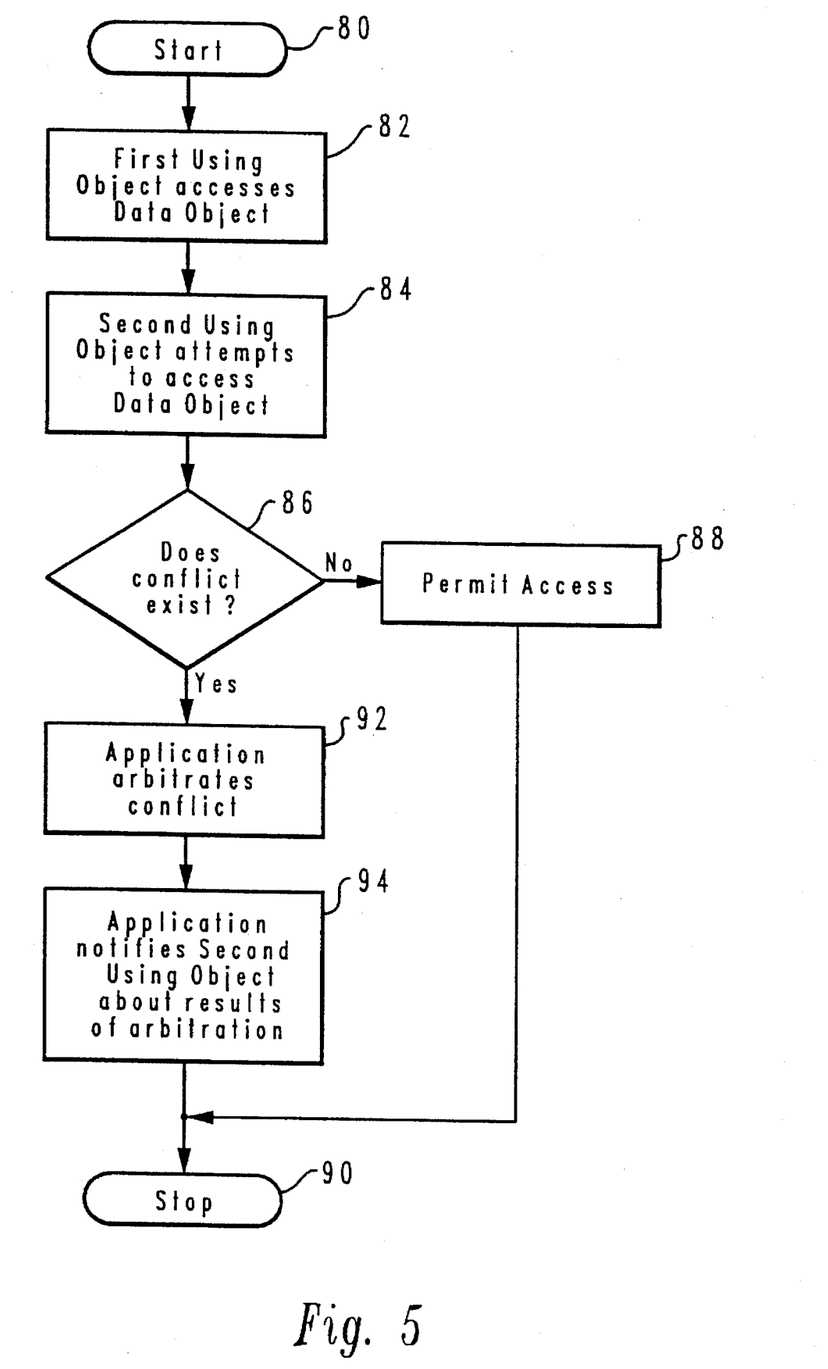
FIG. 5 depicts a high level flow chart illustrating a strong reference relationship and a resolution of a conflict between two users accessing a data object in accordance with the method and system of the present invention.

Referring to FIG. 5, there is depicted a high level flow chart illustrating resolution of a conflict between two users accessing a data object in accordance with the method and system of the present invention. The process starts at block 80 and thereafter passes to block 82 which depicts a first using object accessing a data object. Next, the process passes to block 84 which illustrates a second using object attempting to access the data object. Block 86 then depicts a determination by the application in which the data object resides of whether or not a conflict exists between the current use of the data object by the first using object and the attempted use of the data object by the second using object.

If a determination is made that a conflict does not exist, the process passes to block 88 which illustrates the permission of the access. The process then terminates, as depicted by block 90. Referring again to block 86, if a determination is made that a conflict does exist, the process passes to block 92 which depicts the application arbitrating the conflict. Thereafter the process passes to block 94 which illustrates the application notifying the second using object about the results of the arbitration. The process then terminates, as depicted by block 90.

Figure 6A:
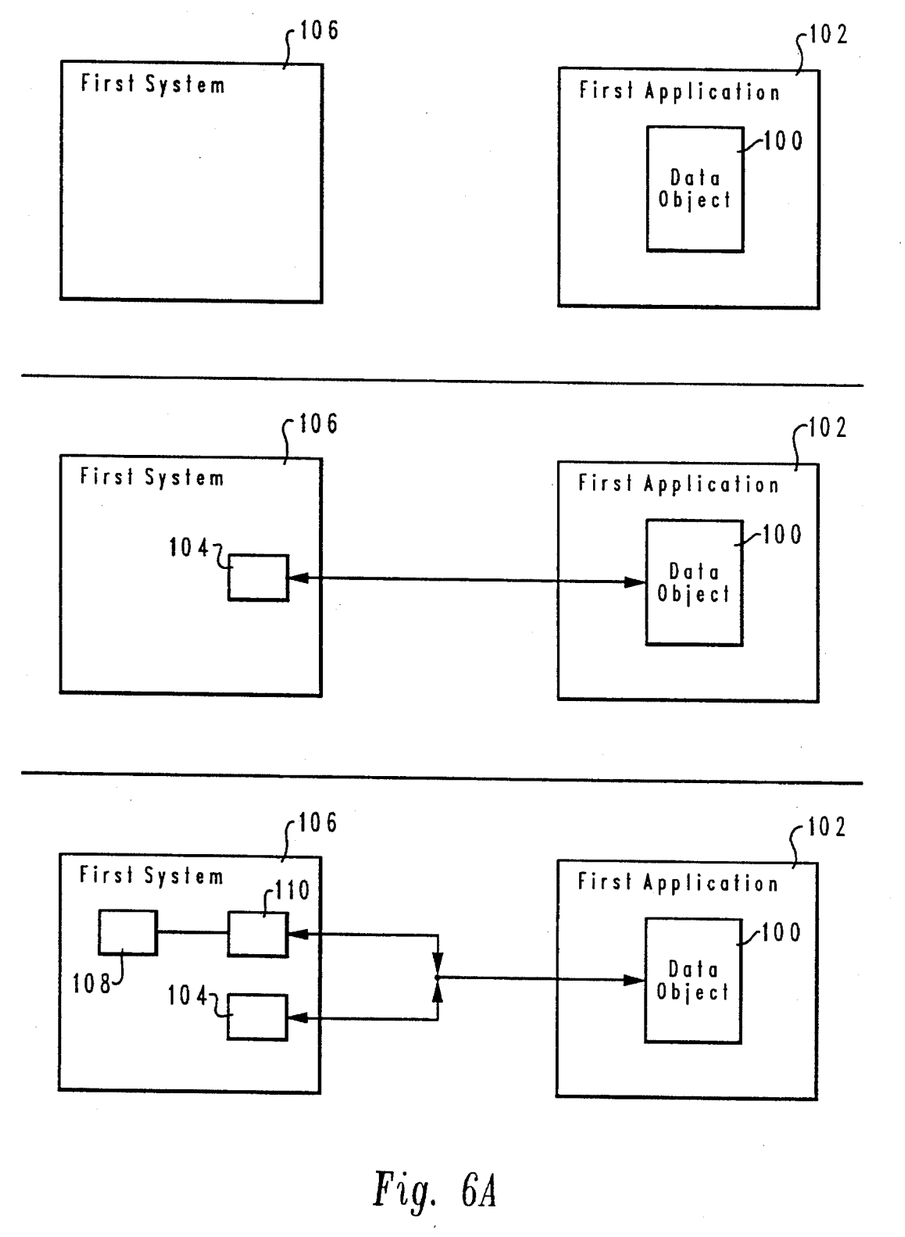
FIGS. 6A, 6B, and 6C together form a block diagram illustrating the transferring of a data object from one application to a second application in accordance with the method and system of the present invention.
Figure 6B:
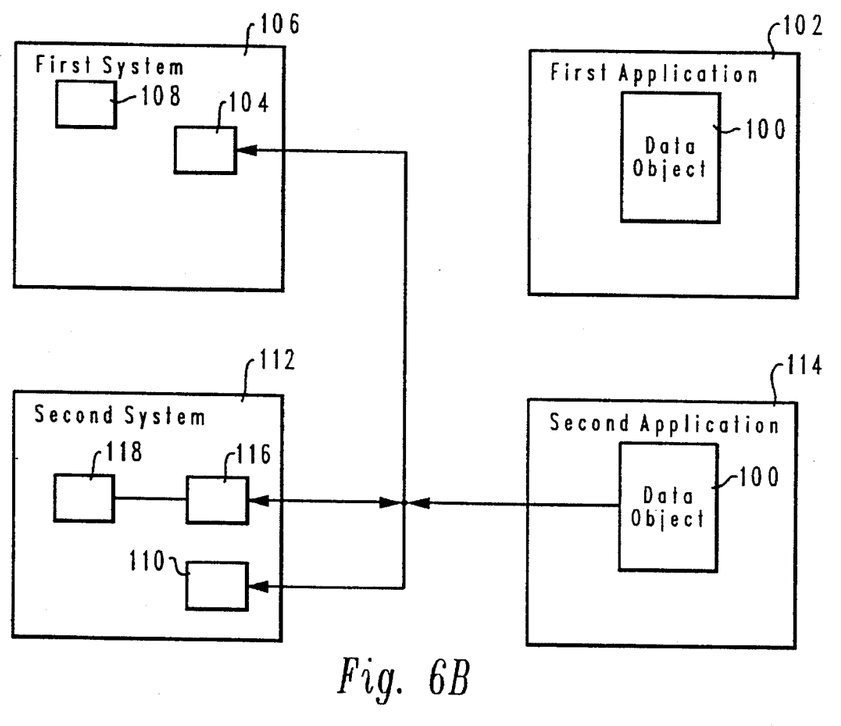
Figure 6C:
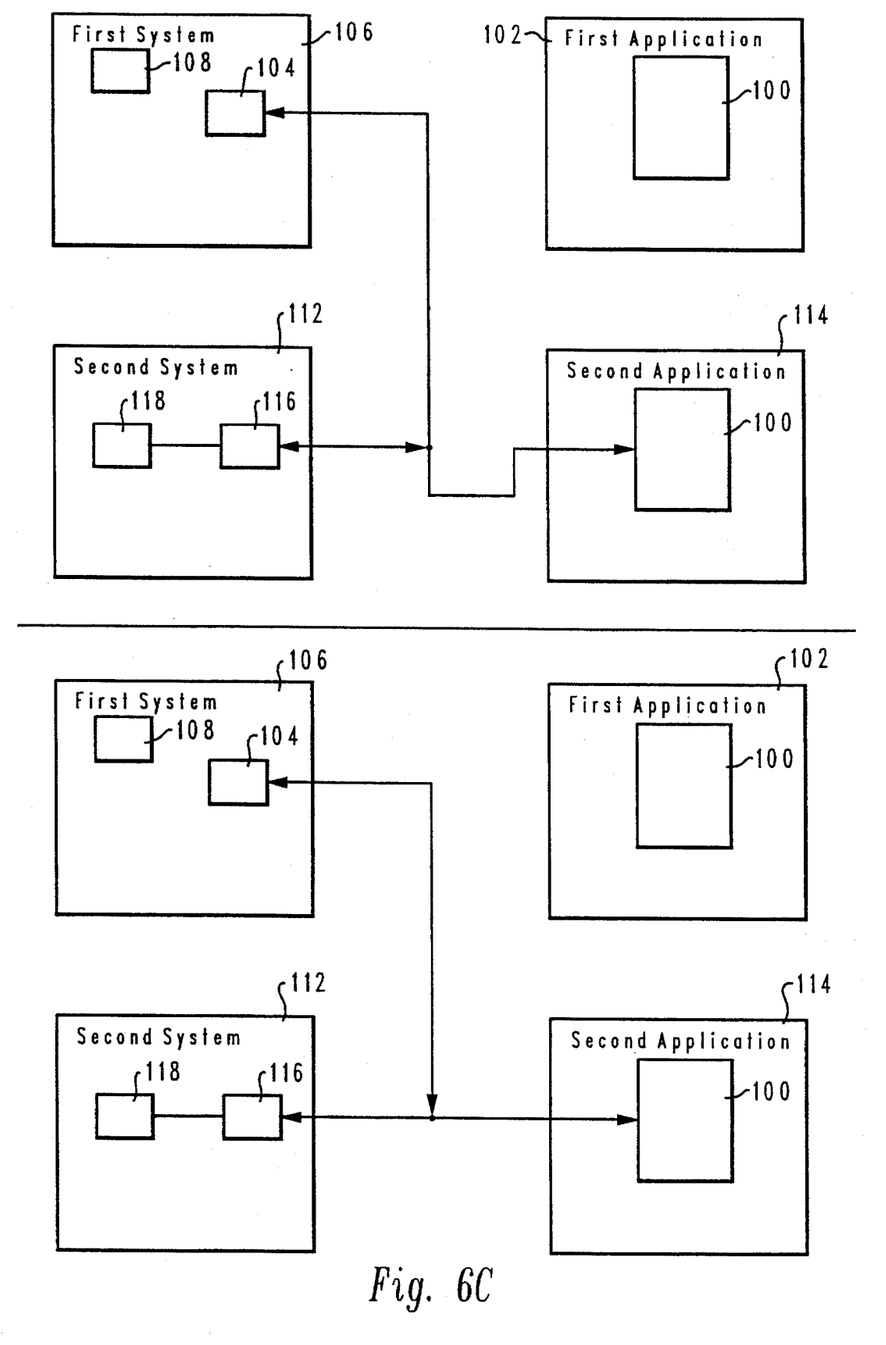

With reference to FIGS. 6A, 6B, and 6C, together there is formed a block diagram illustrating the transferring of a data object from one application to a second application in accordance with the method and system of the present invention. A data object 100 is identified within first application 102. A master-original reference object 104 is then created in a first object oriented environment system 106 and is associated with data object 100. First system 106 and first application 102 may thereafter be linked together.

Reference objects may exist at any one time in one of four states in accordance with the method and system of the present invention; namely, a reference object may exist as a master-original, a master-copy, a copy-original, or a copy-copy. A master-original reference is the type first created and associated with a data object. A copy-original is the duplicate reference object utilized by a using object. During the transfer of objects, master-copy and copy-copy are utilized. Master-copy is a temporary reference object utilized when the sending and receiving systems/applications are the same. A master-copy is transformed into a master-original upon completion of the receipt of the object. Copy-copy is a temporary reference object utilized when the sending and receiving systems/applications are different. A copy-copy is transformed into a copy-original upon completion of the receipt of the object.

Next, when a using object 108 desires to access data object 100, a copy-original reference object 110 is created. Copy-original 110 is a duplicate copy of master-original 104 having the characteristics described above. An entity, such as a user or automated process may then choose to send copy-original reference object 110 to second system 112.

When an entity chooses to send copy-original 110 to a second object oriented environment system 112, data object 100 must be transferred to second application 114 which is linked to second system 112. An entity may choose to either delete data object 100 from first application 102 after data object 100 is transferred, or it may choose to leave a copy of data object 100 with first application 102. In the example described, a copy of data object 100 remains in first application 102 after data object 100 is transferred.

Once copy-original 110 is received by second system 112, a copy-copy reference object 116 is created. Copy-copy 116 is utilized to complete the transfer of data object 100 from first application 102 to second application 114. A second using object 118 will utilize copy-copy 116.

Data object 100 is then transferred to second application 114. Once copy-copy 116 is updated with the new address of data object 100, copy-original 110 is deleted. Copy-copy 116 is then transformed into a copy-original 116.

Figure 7:
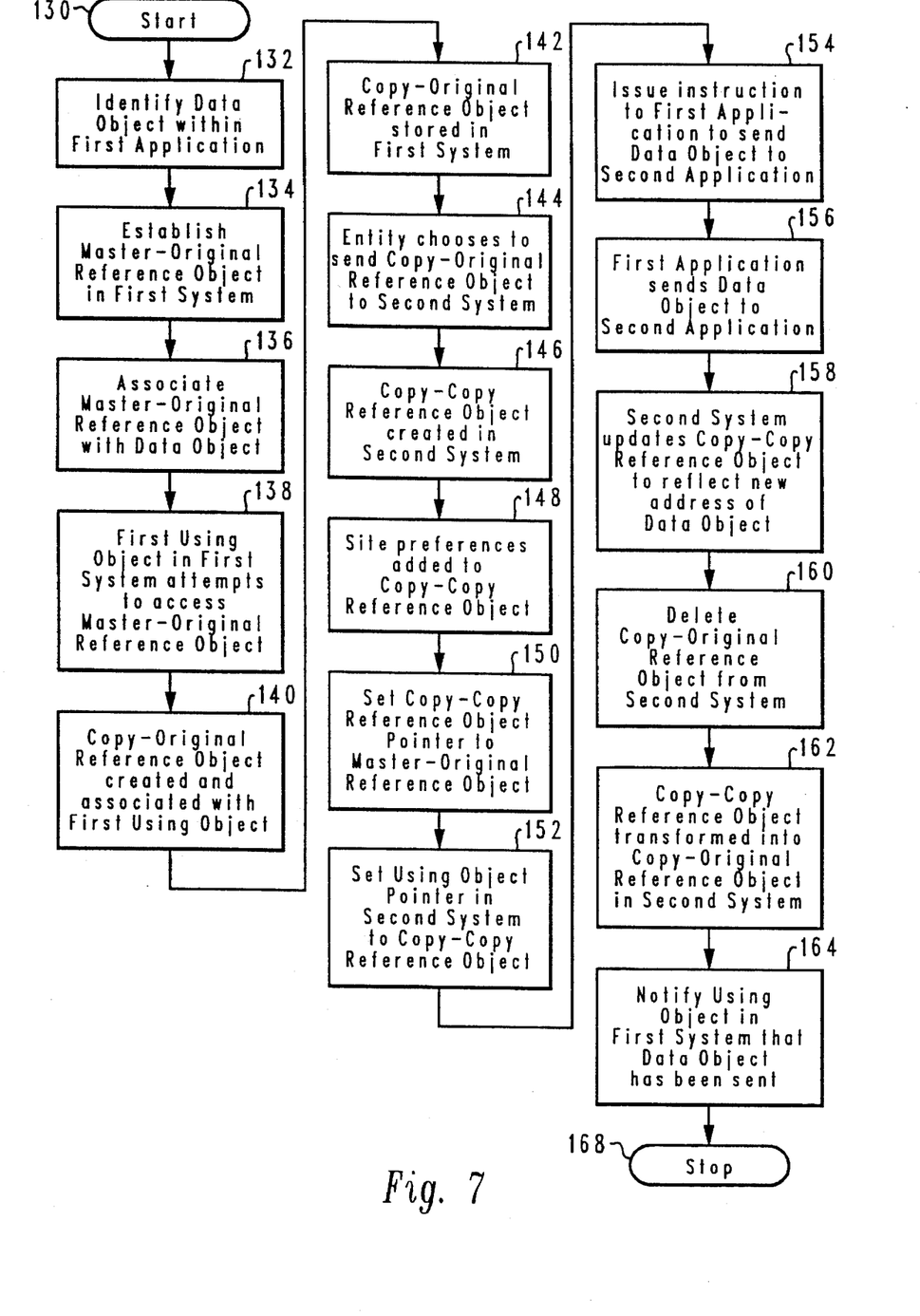
FIG. 7 depicts a high level flow chart illustrating the process of transferring of a data object from one application to a second application in accordance with the method and system of the present invention.

Referring to FIG. 7 there is depicted a high level flow chart illustrating the process of transferring of a data object from one application to a second application in accordance with the method and system of the present invention. The process begins at block 130 and then passes to block 132 which illustrates the identification of a data object within a first application. Next, the process passes to block 134 which depicts the establishment of a master-original reference object in the first object oriented environment system. Thereafter, the process passes to block 136 which illustrates the association of the master-original reference object with the data object.

Block 138 then depicts an attempt by a first using object in the first system to access the master-original reference object. Next, block 140 illustrates a creation of a copy-original reference object and the association of the copy-original object with the first using object. The process then passes to block 142 which depicts the storing of the copy-original reference object in the first system. The process passes next to block 144 which illustrates an entity choosing to send the copy-original reference object to the second system.

Thereafter, the process passes to block 146 which depicts the creation of a copy-copy reference object in the second system. The process then passes to block 148 which illustrates the addition of site preferences to the copy-copy reference object. When one object oriented environment is linked to multiple applications, one application may be chosen as the preferred application for utilization.

Next, the process passes to block 150 which depicts setting the copy-copy reference object pointing to the master-original reference object. The process then passes to block 152 which illustrates setting the pointer of the second using object in the second system to the copy-copy reference object. The process then passes to block 154 which illustrates the issuance of an instruction to the first application to send the data object to the second application. Block 156 then depicts the transfer of the data object form the first application to the second application.

Next, block 158 illustrates the updating of the copy-copy reference object in the second system to reflect the new address of the data object. Thereafter, the process passes to block 160 which depicts the deletion of the copy-original reference object from the second system. The process then passes to block 162 which illustrates the transformation of the copy-copy reference object into a copy-original reference object in the second system. The process passes to block 164 which illustrates the notification to the first using object in the first system that the data object has been sent. The process then terminates, as depicted at block 166.

While the invention has been particularly shown and described with reference to a preferred embodiment, it will be understood by those skilled in the art that various changes in form and detail may be made therein without departing from the spirit and scope of the invention.

What is claimed is:

1. A data processing system having multiple users for enhancing the relationship between a plurality of reference objects in an object oriented programming environment, each of said reference objects associated with one of multiple users, and a data object residing outside said object oriented programming environment, comprising:

means for identifying a data object within an application outside said object oriented programming environment utilizing said data processing system;

means for establishing a plurality of reference objects within said object oriented programming environment in response to said identification of a data object, each of said plurality of reference objects having a unique identifier and each of said plurality of reference objects being associated with one of said multiple users utilizing said data processing system;

means for associating each of said plurality of reference objects within said object oriented programming environment with said identified data object within said application, wherein multiple users may concurrently access said data object utilizing an associated one of said plurality of reference objects utilizing said data processing system;

means for copying one of said reference objects from said object oriented programming environment to a second object oriented programming environment utilizing said data processing system;

means for automatically modifying all of said plurality of reference objects, utilizing said data processing system, in response to said automatic copying of said one of said reference objects; and     means for automatically copying said data object from said application to a second application outside both said object oriented programming environment and said second object oriented programming environment utilizing said data processing system, in response to said automatic copying of one of said reference objects.

2. The data processing system having multiple users for enhancing the relationship between a plurality of reference objects in an object oriented programming environment according to claim 1, further comprising means for automatically verifying the existence of said data object upon the establishment of said plurality of reference objects.

3. The data processing system having multiple users for enhancing the relationship between a plurality of reference objects in an object oriented programming environment according to claim 1, further comprising means for notifying said multiple users, utilizing said data processing system, in response to said automatic copying of said data object.

4. The data processing system having multiple users for enhancing the relationship between a plurality of reference objects in an object oriented programming environment according to claim 1, further comprising means for notifying said multiple users, utilizing said data processing system, in response to said modification of said reference objects.

5. The data processing system having multiple users for enhancing the relationship between a plurality of reference objects in an object oriented programming environment according to claim 1, wherein said means for establishing a plurality of reference objects comprises means for automatically establishing a plurality of reference objects, utilizing said data processing system, in response to said step of identifying a data object.

6. A method in a data processing system having multiple users for enhancing the relationship between a plurality of reference objects in an object oriented programming environment, each of said reference objects associated with one of multiple users, and a data object residing outside said object oriented programming environment, said method comprising the data processing system implemented steps of:

identifying a data object within an application outside said object oriented programming environment utilizing said data processing system;

establishing a plurality of reference objects within said object oriented programming environment in response to said step of identifying a data object, each of said plurality of reference objects having a unique identifier and each of said plurality of reference objects being associated with one of said multiple users utilizing said data processing system;

associating each of said plurality of reference objects within said object oriented programming environment with said identified data object within said application, wherein multiple users may concurrently access said data object utilizing an associated one of said plurality of reference objects utilizing said data processing system;

automatically copying one of said reference objects from said object oriented programming environment to a second object oriented programming environment utilizing said data processing system;

automatically modifying all of said plurality of reference objects, utilizing said data processing system, in response to said automatic copying of said one of said reference objects; and     automatically copying said data object from said application to a second application outside both said object oriented programming environment and said second object oriented programming environment utilizing said data processing system, in response to said automatic copying of one of said reference objects.

7. A method in a data processing system having multiple users for enhancing the relationship between a plurality of reference objects in an object oriented programming environment according to claim 6, further comprising the step of verifying the existence of said data object, utilizing said data processing system, upon the establishment of said plurality of reference objects.

8. A method in a data processing system having multiple users for enhancing the relationship between a plurality of reference objects in an object oriented programming environment according to claim 6 wherein said step of establishing a plurality of reference objects comprises the step of automatically creating said plurality of reference objects in response to said step of identifying said data object.

9. A method in a data processing system having multiple users for enhancing the relationship between a plurality of reference objects in an object oriented programming environment according to claim 6 further comprising the step of notifying said multiple users, utilizing said data processing system, in response to said automatic copying of said data object.

\* \* \* \* \*

UNITED STATES PATENT AND TRADEMARK OFFICE
CERTIFICATE OF CORRECTION

PATENT NO. : 5,511,196
DATED : April 23, 1996
INVENTOR(S) : Shackelford et al.

It is certified that error appears in the above-indentified patent and that said Letters Patent is hereby corrected as shown below:

Column 3, line 55: insert --42,-- before "44,"

Signed and Sealed this

Twenty-seventh Day of August, 1996

Attest:

BRUCE LEHMAN

*Attesting Officer*  *Commissioner of Patents and Trademarks*